United States Patent [19]

Scola et al.

[11] Patent Number: 4,820,567
[45] Date of Patent: Apr. 11, 1989

[54] MICROCRACK RESISTANT FIBER REINFORCED RESIN MATRIX COMPOSITE LAMINATES

[75] Inventors: Daniel A. Scola, Glastonbury; David J. Parker, Newtown, both of Conn.

[73] Assignee: United Technologies Corporation, Hartford, Conn.

[21] Appl. No.: 921,997

[22] Filed: Oct. 22, 1986

[51] Int. Cl.⁴ .................. B32B 5/12; B32B 9/00; C01B 31/00
[52] U.S. Cl. .................. 428/105; 428/408; 428/902; 428/113; 264/29.7
[58] Field of Search ............. 428/105, 113, 408, 902; 423/447.1, 447.2; 264/29.5, 29.7

[56] References Cited

U.S. PATENT DOCUMENTS

| | | | |
|---|---|---|---|
| 4,255,478 | 3/1981 | Crane | 428/113 |
| 4,265,968 | 5/1981 | Prewo | 428/408 X |
| 4,413,860 | 11/1983 | Prescott | 428/105 X |
| 4,433,115 | 2/1984 | Varma et al. | 428/408 X |

OTHER PUBLICATIONS

Fracture Toughness of Bismaleimide Resins; Microcracking in 0,90 Cross-ply Bismaleimide/Graphite Composites, Daniel A. Scola et al, SAMPE Journal, Mar./Apr. 1986, pp. 47-54.

Primary Examiner—George F. Lesmes
Assistant Examiner—Susan S. Rucker
Attorney, Agent, or Firm—Kevin E. McVeigh

[57] ABSTRACT

A microcrack resistant graphite fiber reinforced high temperature resin matrix composite laminate is disclosed. The laminate comprises layers having the fiber reinforcement in parallel alignment within each layer. The layers are arranged such that the fibers are oriented at 0° and 90° (±10°) in alternating layers. The specific number of plies per layer is selected so as to produce microcrack resistance. A method for making a microcrack resistant graphite fiber reinforced high temperature resin matrix composite laminate is also disclosed.

6 Claims, 1 Drawing Sheet

28X

28X

MICROCRACK RESISTANT FIBER REINFORCED RESIN MATRIX COMPOSITE LAMINATES

TECHNICAL FIELD

The field of art to which this invention pertains is fiber reinforced composite materials.

BACKGROUND ART

The use of fiber reinforced resin matrix composite laminates has been widely accepted, particularly within the aerospace and automotive industries, due to the high specific strength and stiffness of such materials. The strong interest in applying composite laminates is motivated primarily by the weight reduction and the associated cost and performance benefits that typically arise when such materials are used to replace metals. A major obstacle to expansion of the range of applicability of composite laminates has been the temperature limitations of the resin matrix materials.

Resin matrix materials with increased temperature resistance, for example, bismaleimide and polyimide resins as well as some epoxy formulations, have been developed. A serious detriment associated with the use of these advanced resin matrix materials to produce high temperature composite laminates is the problem of microcracking. Microcracking is the formation of a multitude of small fractures in the resin matrix of a composite laminate. The fractures typically develop under two sets of circumstances, either as the laminate is cooled to ambient temperature following an elevated temperature resin cure cycle or as the laminate undergoes temperature cycling during use. High temperature composite laminates are particularly susceptible to microcracking due to the brittleness that characterizes the high temperature resistant resin matrix materials and extreme temperatures enountered during fabrication and use.

What is needed in this art is microcrack resistant fiber reinforced resin matrix composite laminates for elevated temperature applications.

DISCLOSURE OF INVENTION

A composite laminate, comprising a plurality of plies of graphite fiber reinforced resin, having the graphite fibers aligned in substantially unidirectional orientation within each ply, and having the plies aligned in layers and laid up in the laminate according to the formula:

$$(A_xB_yA_x)_n$$

wherein A and B denote the orientation of the fibers in successive layers as the angular displacement of the fiber direction relative to a reference direction of 0°, and x and y denote the number of plies comprising each of the successive layers, and n denotes the number of times the three-layer unit ($A_xB_yA_x$) is repeated in the laminate, and $A = 90° \pm 10°$
$B = 0°$
$x = 2, 3, 4$ or $5$
$y = 7, 8$ or $9$ if $x = 2$, and $2, 7, 8$ or $9$ if $x = 3$, and $2$ or $3$ if $x = 4$ or $5$
$n =$ an integer $\geq 1$ if $y = 7, 8$ or $9$, and an integer $\geq 2$ if $y = 2$ or $3$, said fiber having a tensile modulus between 30 million and 60 million, said resin requiring processing at temperatures between 300° F. and 500° F. and exhibiting a bulk strain to failure ratio of less than about 2%, and said composite laminate being resistant to microcracking, is disclosed.

A method by which a substantially microcrack free composite laminate may be fabricated is also disclosed. The method comprises the steps of laying up plies of graphite fiber reinforced resin according to the formula discussed above to form a laminate, heating the laminate to a temperature between 300° F. and 400° F. to cure the resin, and heating the laminate to a temperature between 350° F. and 500° F. to postcure the resin.

The foregoing, and other features and advantages of the present invention will become more apparent from the following description and accompanying drawings.

BEST MODE FOR CARRYING OUT THE INVENTION

Figure 1:
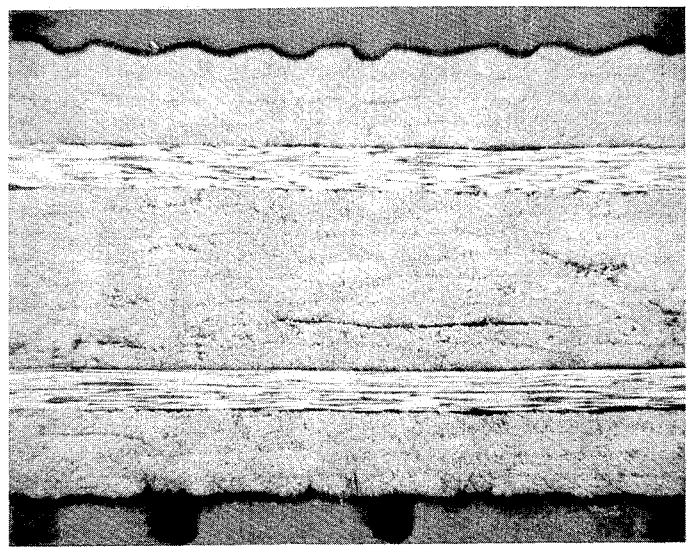
FIG. 1 is a photomicrograph of a sectioned composite laminate of the present invention in which no microcracking is observable.

A resin system that will impart high strength to the composite and requires processing between 300° F. and 500° F. and exhibits a bulk strain to failure ratio of less than about 2 percent is suited for use with the present invention. Such resin systems include bismaleimide resins, as well as some epoxy resins and some polyimide resins. The bismaleimide resins are preferred. Of the bismaleimide resins, a resin that was found to be well suited for use with the present invention is known as 5245C available from Narmco.

The fiber reinforcement in the present invention is graphite fiber that exhibits high tensile strength, a tensile modulus between 30 million and 60 million and high thermal stability. Graphite fibers produced from a polyacrylonitrile precursor, known as PAN graphite fiber, are preferred. A PAN graphite fiber that was found to be well suited for use with the present invention is known as HiTex 42 available from Hitco Materials.

The resin matrix and fiber reinforcement are combined to produce a graphite fiber reinforced resin matrix tape, wherein the graphite fibers are continuous and aligned in unidirectional orientation. Such resin impregnated fiber tape, known as a "prepreg" may be purchased from commercial sources or may be produced by conventional techniques. An exemplary production technique is to impregnate a fiber with resin and binder, and collimate the impregnated fiber to form a prepreg tape. The volume ratio of resin to fiber typically ranges between 45/55 and 35/65 with about 40/60 being preferred. A commercially available tape comprising 5245C bismaleimide resin/HiTex 42 graphite fiber available from Narmco was found to be well suited for use with the present invention.

The composite laminate of the present invention comprises a plurality of plies of the graphite fiber reinforced resin matrix tape. A number of plies are laid up to form layers such that the fiber reinforcement of each ply is in parallel alignment with the fiber reinforcement of the other plies in the same layer. The number of plies laid up in such parallel orientation determines the thickness of the layer so formed.

The laminate is built up of three-layer units, each unit having one central layer and two outer layers. The parallel fibers in both of the outer layers of each unit are oriented in the same direction. The parallel fibers in the central layer of each unit are oriented at an angle of $90° \pm 10°$ relative to the orientation of the fibers in the two outer layers. In laminates comprising a repeating sequence of three-layer units, the fibers of the central layer of each three-layer unit are in parallel alignment with the fibers of the central layers in each of the other three-layer units.

The configurations in which the plies are laid up to form the laminate of the present invention may be described by the formula:

$$(A_x B_y A_x)_n$$

wherein A and B denote the orientation of the fibers in successive layers as the angular displacement of the fiber direction relative to a reference direction of 0°, x and y denote the number of plies comprising each of the successive layers, and n denotes the number of times the three-unit layer $(A_x B_y A_x)$ is repeated in the laminate, and $A = 90° \pm 10°$
$B = 0°$
$x = 2, 3, 4$ or $5$
$y = 7, 8$ or $9$ if $x = 2$, and $2, 7, 8$ or $9$ if $x = 3$, and $2$ or $3$ if $x = 4$ or $5$
$n = $ an integer $\geq 1$ if $y = 7, 8$ or $9$, and an integer $\geq 2$ if $y = 2$ or $3$ The plies are typically laid up by conventional vacuum bag procedure, wherein the uncured laminate is enclosed in a vacuum bag and subjected to a vacuum to remove air pockets between the plies prior to curing the laminate and the enclosed laminate is subjected to pressure, typically in the range of 80–125 psi during some part of the elevated temperature curing cycle.

The high temperature resin matrix materials that are suitable for use with the present invention may be cured at temperatures between 300° F. and 400° F. and postcured at temperatures between 400° F. and 500° F. The cure and postcure times are dependent upon the temperatures chosen.

For example, the Narmco 5245C bismaleimide resin matrix may be cured by heating the laminate from room temperature to 350° F. at a rate of 2° F./min, held at 350° F. for 3 hours under 100 psi pressure, allowed to cool to room temperature and then heated to 400° F. at 2° F./min, and held at 400° F. for 8 hours, then allowed to cool to room temperature at 2° F./min.

EXAMPLE 1

Plies of Narmco 5245C/HiTex 42 prepreg tape were laid up to form a composite laminate described by the formula (wherein the variables have the significance previously assigned and values as assigned below):

$$(A_x B_y A_x)_n = (90_4 0_2 90_4)_2$$

The laminate was enclosed in a vacuum bag and subjected to a vacuum. The bagged laminate was heated at a rate of 2° F./minute from room temperature to a temperature of 350° F. and held at 350° F. for 3 hours. The bagged laminate was subjected to a pressure of 100 pounds per square inch and the vaccuum within the bag was released after 1 hour. After 3 hours at 350° F. the laminate was allowed to cool to room temperature at an uncontrolled rate. The vacuum bag was removed.

The cured laminate was then postcured. The laminate was heated at a rate of 2° F./minute to a temperature of 400° F. and held at 400° F. for 16 hours. After 16 hours at 400° F. the laminate was allowed to cool to room temperature at a rate of 2° F./minute.

The composite laminate so formed was observed to be free from microcracks.

EXAMPLE 2

Plies of Narmco 5245C/HiTex 42 prepreg tape were laid up to form a composite laminate described by the formula (wherein the variables have the significance previously assigned, and values as assigned below):

$$(A_x B_y A_x)_n = (90_4 0_2 90_4)_2$$

The laminate was fabricated and cured by the procedure previously described in Example 1.

The laminate so produced was found to be free from microcracks.

EXAMPLE 3

Plies of Narmco 5245C/HiTex 42 prepreg tape were laid up to form composite laminates described by the following formulae (wherein the variables have the significance previously assigned and the values assigned below):

$$(A_x B_y A_x)n = (90_2 0_8 90_2)_1,$$
$$(90_2 0_{16} 90_2)_1,$$
$$(90_6 0_4 90_6)_1,$$
$$(90_3 0_2 90_3)_1,$$
$$(90_4 0_2 90_4)_1,$$
$$(90_4 0_2 90_4)_2, \text{ and}$$
$$(A_x B_y A_x B_z)n = (90_2 0_{16} 90_2 0_8)_2$$

where z denotes the number of plies in the corresponding layer.

The laminates were fabricated by vacuum bag lay up procedures as discussed above. Several cure cycles were investigated for each of the above configurations and are summarized below in Table 1.

The vacuum bagged laminates were heated at a rate of 2° F./minute from room temperature (R.T.) to the cure temperature. The cure temperatures, the pressure and the holding time at each cure temperature are tabulated for each cure cycle.

The free standing cured laminates were heated at a rate of 2° F./minute from room temperature to the postcure temperature. The post cure temperatures and holding time at each postcure temperature are noted for each postcure cycle.

TABLE 1

| Cure Cycles | | | |
|---|---|---|---|
| Cure Method # | | | |
| C4 | R.T.→ | 165° F.→ | 350° F. |
| | | 100 psi | 100 psi |
| | Vacuum | 0.45 hr | 3 hr |
| C5 | R.T.→ | 350° F. | |
| | | 100 psi | |
| | Vacuum | 3 hr | |
| Post Cure Method # | | | |
| PC1 | R.T. → | 400° F.→ | R.T. |
| | | 4 hr | |
| PC2 | R.T. → | 400° F.→ | R.T. |
| | | 8 hr | |
| PC3 | R.T. → | 400° F.→ | 450° F.→ | R.T. |

TABLE 1-continued

| | Cure Cycles | | | |
|---|---|---|---|---|
| PC4 | R.T. → | 4 hr 400° F.→ 16 hr | hr | R.T. |

Optical observations with regard to microcrack formation in each of the laminate configurations were made. The laminates were cut in half and a sample 1 inch by 0.5 inch was sectioned from the center portion, and polished for optical observation. The polished samples were optically examined under 28x magnification.

For a detailed description of the test results see the paper "Fracture Toughness of Bismaleimide Resin; Microcracking in 0, 90 Crossply Bismaleimide/Graphite Composites," by D. Scola et al, the disclosure of which is incorporated herein by reference.

The microcracking observations are presented in Table 2. Laminate configurations are listed versus the cure cycles investigated for each configuration. The cure cycles are tabulated in Table 1. Microcrack observations are tabulated for each combination of configurations and cure cycle. An "x" denotes microcracking and "o" denotes no microcracking.

TABLE 2

| | Microcracking Observations | | | | |
|---|---|---|---|---|---|
| | Cure Cycle | | | | |
| Laminate Configuration | C4-PC2 | C5-PC1 | C5-PC2 | C5-PC3 | C5-PC4 |
| $90_2 0_8 90_2$ | o | o | o | o | o |
| $90_2 0_{16} 90_2$ | x | x | x | x | x |
| $(90_2 0_{16} 90_2 0_8)_2$ | o | x | x | x | o |
| $90_6 0_4 90_6$ | x | x | o | x | x |
| $90_3 0_2 90_3$ | x | x | o | x | x |
| $90_4 0_2 90_4$ | x | x | o | x | o |
| $(90_4 0_2 90_4)_2$ | o | o | o | o | o |

A photomicrograph of the laminate configuration $(A_x B_y A_x)_n = (90_4 0_2 90_4)_2$ cured by method C-4 and postcured by method PC2, taken at 28x magnification and showing no observable microcracks is shown in FIG. 1.

Figure 2:
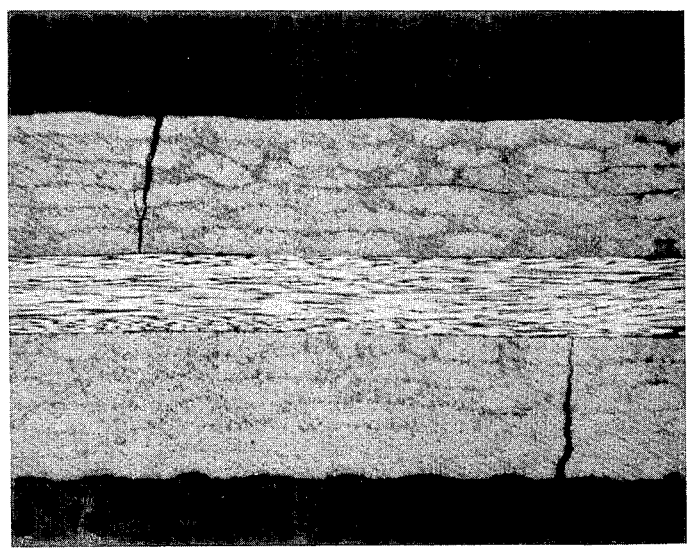
FIG. 2 is a photomicrograph of a sectioned composite laminate in which microcracking is observable.

A photomicrograph of the laminate composition $(A_x B_y A_x)_n = (90_6 0_4 90_6)$, cured by method C4 and postcured by method PC2, taken at 28x magnification and showing observable microcracks is shown in FIG. 2.

The composite laminate of the present invention may be used in applications in which exposure to temperatures up to about 350° F. is anticipated (and even brief exposures as high as 450° F.) and which require a high degree of axial stiffness. Such applications include, for example, beams and spars in airframe structures, engine guide vanes, wing skins and longerons.

The composite laminate of the present invention is substantially microcrack free after fabrication, cure and postcure and is resistant to temperature cycling related microcracking during use.

Although this invention has been shown and described with respect to detailed embodiments thereof, it will be understood by those skilled in the art that various changes in form and detail thereof may be made without departing from the spirit and scope of the claimed invention.

We claim:

1. A composite laminate, comprising a plurality of plies of graphite fiber reinforced resin, having the graphite fibers aligned in substantially unidirectional orientation within each ply, and having the plies aligned in layers and laid up in the laminate according to the formula:

$$(A_x B_y A_x)_n$$

wherein A and B denote the orientation of the fibers in successive layers as the angular displacement of the fiber direction relative to a reference direction of 0°, and x and y denote the number of plies comprising each of the successive layers, and n denotes the number of times the three-layer unit $(A_x B_y A_x)$ is repeated in the laminate, and
A = 90° ± 10°
B = 0°
x = 2, 3, 4 or 5
y = 7, 8 or 9 if x = 2, and 2, 7, 8 or 9 if x = 3, and 2 or 3 if x = 4 or 5
n = an integer ≧ 1 if y = 7, 8 or 9, and an integer ≧ 2 if y = 2 or 3,
said fiber having a tensile modulus between 30 million and 60 million, said resin requiring processing at temperatures between 300° F. and 500° F. and exhibiting a strain to failure ratio of less than about 2%, and said composite laminate being substantially microcrack free.

2. The composite laminate of claim 1 wherein
A = 90°
B = 0°
x = 4
y = 2
n = an integer ≧ 2
and the resin comprises bismaleimide resin.

3. The composite laminate of claim 1 wherein
A = 90°
B = 0°
x = 2
y = 8
n = an integer ≧ 1
and the resin comprises bismaleimide resin.

4. A method of making a composite laminate, comprising
(a) laying up a plurality of plies of graphite fiber reinforced resin, having the graphite fibers aligned in substantially unidirectional orientation within each ply, and having the plies aligned in layers and laid up in the laminate according to the formula:

$$(A_x B_y A_x)_n$$

wherein A and B denote the orientation of the fibers in successive layers as the angular displacement of the fiber direction relative to a reference direction of 0°, and x and y denote the number of plies comprising each of the successive layers, and n denotes the number of times the three-layer unit $(A_x B_y A_x)$ is repeated in the laminate, and
A = 90° ± 10°
B = 0°
x = 2, 3, 4 or 5
y = 7, 8 or 9 if x = 2, and 2, 7, 8 or 9 if x = 3, and 2 or 3 if x = 4 or 5
n = an integer ≧ 1 if y = 7, 8 or 9, and an integer ≧ 2 if y = 2 or 3,
(b) heating the laminate to a temperature between 300° F. and 400° F. to cure the resin,
(c) heating the laminate to a temperature between 350° F. and 500° F. to postcure the resin, said fiber having a tensile modulus between 30 million and 60 million, said resin exhibiting a bulk strain to failure ratio of less than about 2%, and said composite laminate being substantially microcrack free.

5. The method of claim 4 wherein
A=90°
B=0°
x=4
y=2
n=an integer≧2 and the resin comprises bismaleimide resin.

6. The method of claim 4 wherein
A=90°
B=0°
x=2
y=8
n=an integer≧1 and the resin comprises bismaleimide resin.

* * * * *